United States Patent [19]

Manecke et al.

[11] 4,296,603
[45] Oct. 27, 1981

[54] TEMPERATURE RESPONSIVE PISTON AND CYLINDER UNIT HAVING A HEATER CARRIED THEREBY

[75] Inventors: Siegfried E. Manecke; Thomas M. Buckshaw, both of Indiana, Pa.

[73] Assignee: Robertshaw Controls Company, Richmond, Va.

[21] Appl. No.: 116,318

[22] Filed: Jan. 28, 1980

Related U.S. Application Data

[62] Division of Ser. No. 856,404, Dec. 1, 1977, Pat. No. 4,206,780.

[51] Int. Cl.³ ............................................... F03G 7/06
[52] U.S. Cl. .................................................... 60/528
[58] Field of Search .......................... 60/528; 251/11

[56] References Cited

U.S. PATENT DOCUMENTS 3,976,244 8/1976 Logsdon ........................ 236/49

Primary Examiner—Allen M. Ostrager
Attorney, Agent, or Firm—Candor, Candor & Tassone

[57] ABSTRACT

A temperature responsive piston and cylinder unit wherein the piston thereof is extended relative to the cylinder thereof when the unit is heated and the piston is adapted to be retracted into the cylinder when the unit is cooled. An annular electrical heater is carried in substantially a concentric manner on the cylinder of the unit for heating the unit to extend the piston thereof when the heater is activated. The heater comprises a pair of telescoping annular electrical insulating members telescoped on the cylinder of the unit and an electrical heater member disposed between the insulating members to be energized by having an electrical current passed therethrough.

9 Claims, 7 Drawing Figures

TEMPERATURE RESPONSIVE PISTON AND CYLINDER UNIT HAVING A HEATER CARRIED THEREBY

CROSS REFERENCE TO RELATED PATENT APPLICATION

This application is a divisional patent application of its copending parent patent application, Ser. No. 856,404 filed, Dec. 1, 1977, now U.S. Pat. No. 4,206,780.

BACKGROUND OF THE INVENTION

1. Field of Search

This invention relates to an improved pressure operated water level control device and to an improved temperature responsive piston and cylinder unit for such a control device or the like.

2. Prior Art Statement

It is well known to provide a pressure operated water level control device having a movable selector means for selecting different water level settings thereof.

It is also well known to provide a temperature responsive piston and cylinder device or other heat motor means for controlling various devices when the heat motor means is activated.

For example, see the following six U.S. Pats.:

No. 3,127,104—Puster
No. 3,341,119—Tyler
No. 3,359,387—Rhodes
No. 3,386,655—Willson
No. 3,880,229—Caldwell
No. 3,976,244—Logsdon The above Patent to Rhodes, No. 3,359,387, discloses a pressure operated water level control device having movable selector means for selecting different water level settings thereof.

The Patent to Puster, No. 3,127,104 and the Patent to Caldwell, No. 3,880,229 each provides a temperature responsive piston and cylinder unit which extends its piston when the unit is heated and is adapted to retract its piston when cooled, the Patent to Puster controlling an engine radiator valve construction with the temperature responsive unit and the patent to Caldwell controlling a a building duct damper with its respective unit.

The Patent to Willson, No. 3,386,655 provides an electrically operated heat motor for changing the effective control setting of an oven temperature control device to cut back a high cooking temperature setting of the selector means to provide a low temperature non-cooking operation after a preselected time period.

The Patent to Tyler, No. 3,341,119 provides an electrically operated heat motor means for unlocking a movable part of an oven control device so the control device will provide a lower temperature setting from the initial high temperature setting of the selector means thereof after the occurence of an event.

The patent to Logsdon, No. 3,976,244, provides a piston and cylinder temperature responsive device for actuating flow control means of an air conditioning system and having a heater means telescopically disposed on the cylinder thereof, the heater means appears to be a coil of electrical wire.

It was suggested by others that it would be desirable to provide a pressure operated water level control device which would automatically return to a low water level setting thereof after the completion of a washing operation of the washing machine utilizing such device so that during a subsequent use of the washing machine, it would require the operator to set the water level control device at a higher water level setting if such higher water level setting was desired. Thus, a mistake of providing a high water level setting for only a small load would not be made merely because the water level control device had been previously set for the highest water level setting for a previous wash load. In this manner, it was believed that an energy savings would be provided by such a unit.

SUMMARY OF THE INVENTION

It is a feature of this invention to provide a heat motor means for turning the selector means of a pressure operated water level control device to a certain low water level setting thereof when the heat motor means is activated, such as at the end of a wash cycle of a washing machine utilizing such control device.

In particular, one embodiment of this invention provides a pressure operated water level control device having a movable selector means for selecting different water level settings thereof. A heat motor means is carried by the device and is operatively associated with the selector means for moving the selector means to a certain water level setting thereof when the heat motor means is activated.

It is another feature of this invention to provide an improved temperature responsive piston and cylinder unit that can be utilized as the heat motor means for the water level control device of this invention or which can be utilized for other purposes, as desired.

In particular, one embodiment of this invention provides a temperature responsive piston and cylinder unit wherein the piston thereof is extended relative to the cylinder thereof when the unit is heated and the piston is adapted to be retracted into the cylinder when the unit is cooled. An annular electrical heater means is carried in substantially a concentric manner on the cylinder of the unit for heating the unit to extend the piston thereof when the heater means is activated.

The heater means comprises a pair of telescoping annular electrical insulating members telescoped on the cylinder of the unit and an electrical heater member disposed between the insulating members to be energized by having an electrical current passed therethrough.

Accordingly, it is an object of this invention to provide an improved pressure operated water level control device having one or more of the novel features of this invention as set forth above or hereinafter shown or described.

Another object of this invention is to provide an improved temperature responsive piston and cylinder unit having one or more of the novel features of this invention as set forth above or hereinafter shown or described.

Other objects, uses, and advantages of this invention are apparent from a reading of this description which proceeds with reference to the accompanying drawings forming a part thereof and wherein.

Figure 1:
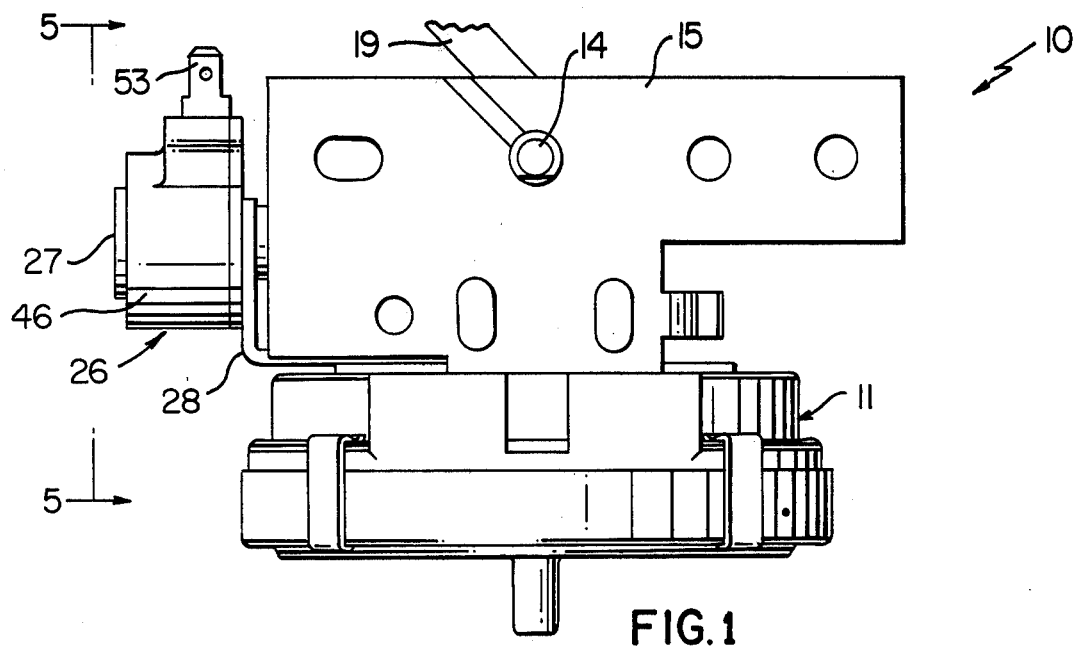
FIG. 1 is a front view of the improved pressure operated water level control device of this invention.

While the various features of this invention are hereinafter described and illustrated as being particularly adapted to provide means for automatically moving the selector means of a pressure operated water level control device to a certain low water level setting thereof, it is to be understood that the various features of this invention can be utilized singly or in any combination thereof to provide motor means for other devices as desired.

Therefore this invention is not to be limited to only the embodiment illustrated in the drawings because the drawings are merely utilized to illustrate one of the wide variety of uses of this invention.

Figure 2:
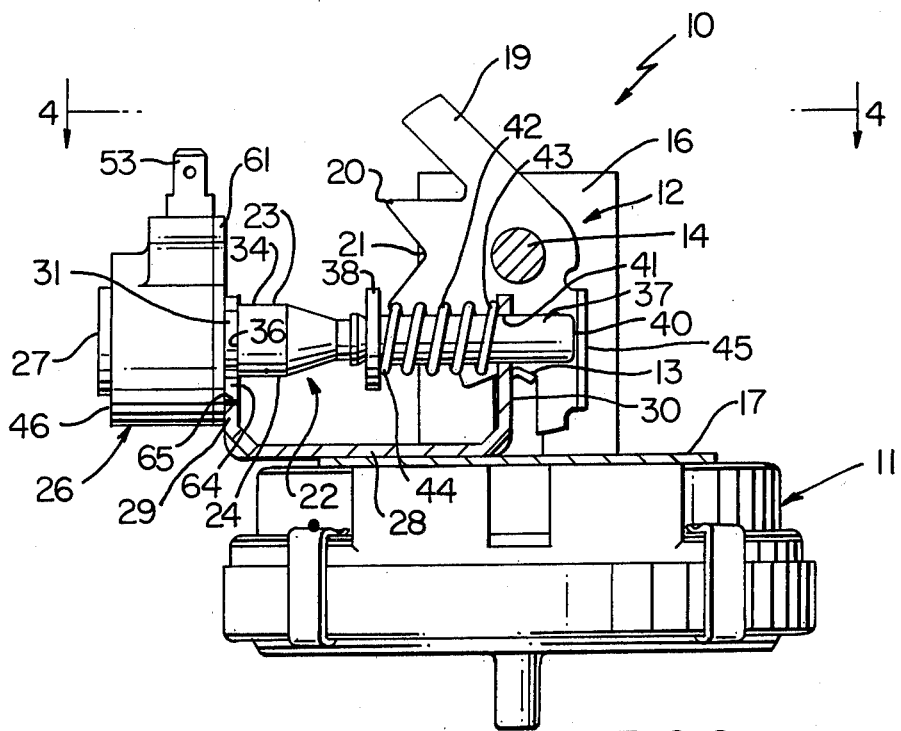
FIG. 2 is a view similar to FIG. 1 and illustrates the front plate removed and part of the bracket structure of the device in cross section.

Referring now to FIGS. 1 and 2, the improved pressure operated water level control device of this invention is generally indicated by the reference numeral 10 and comprises a housing means 11 containing therein suitable electrical switch means (not shown) that control a washing machine or the like to terminate the filling of the machine with water when the water level of the machine reaches a level that is selected by a selector means 12 of the control device 10 and is sensed by the device 10 in a manner conventional in the art.

Therefore, the details of the control device 10 for controlling the water level of a washing machine or the like need not be further described. However, if it is desired to find out more of the structure and details of a typical water level control device, reference can be made to the aforementioned U.S. Pat. No. 3,359,387 to Rhodes.

The selector means 12 is adapted to act on a movable switch actuator member 13 to set the same in various positions thereof to select the various water level settings of the control device 10.

In particular, the selector means 12 includes a rotatable selector shaft 14 rotatably mounted in spaced upstanding bracket flanges 15 and 16 of a bracket member 17 that is secured to the housing means 11 in any suitable manner whereby the control shaft 14 has one projecting end 18 adapted to be provided with a suitable control knob (not shown) for rotating the shaft 14 relative to the device 10 to the various water level settings thereof.

The control shaft 14 carries a cam plate 19 fixed thereto and provided with various cam lobes 20 and valleys 21 therebetween to respectively receive and set the position of the actuator 13 therein for different rotational settings of the shaft 14 to thereby produce different water level settings for the control device 10 in a conventional manner.

Thus, when the selector shaft 14 is set in the position illustrated in FIG. 2, the control device 10 has been set to provide a high water level in the washing machine to be controlled thereby. In contrast, when the selector means 12 is set in the position illustrated in FIG. 3, the control device 10 is set to provide a certain low water level for the washing machine.

As previously stated, it is a feature of this invention to provide heat motor means for automatically turning the selector means 12 from the high water level setting thereof of FIG. 2 to the certain low water level setting of FIG. 3 when the heat motor means is activated in a manner hereinafter described, such heat motor means of this invention being generally indicated by the reference numeral 22 and will now be described. The heat motor means 22 comprises a temperature responsive piston and cylinder unit 23 having a stepped cylinder and a piston 25 that is extended out of the cylinder 24 from the position illustrated in FIG. 2 to the position illustrated in FIG. 3 when a suitable wax charge or the like within the cylinder 24 has been heated to a certain temperature in a manner conventional in the art, the piston 25 being adapted to be spring retracted back into the cylinder 24 from the position illustrated in FIG. 3 back to the position illustrated in FIG. 2 when the wax charge within the cylinder 24 cools below a certain temperature as is well known in the art.

Figure 7:
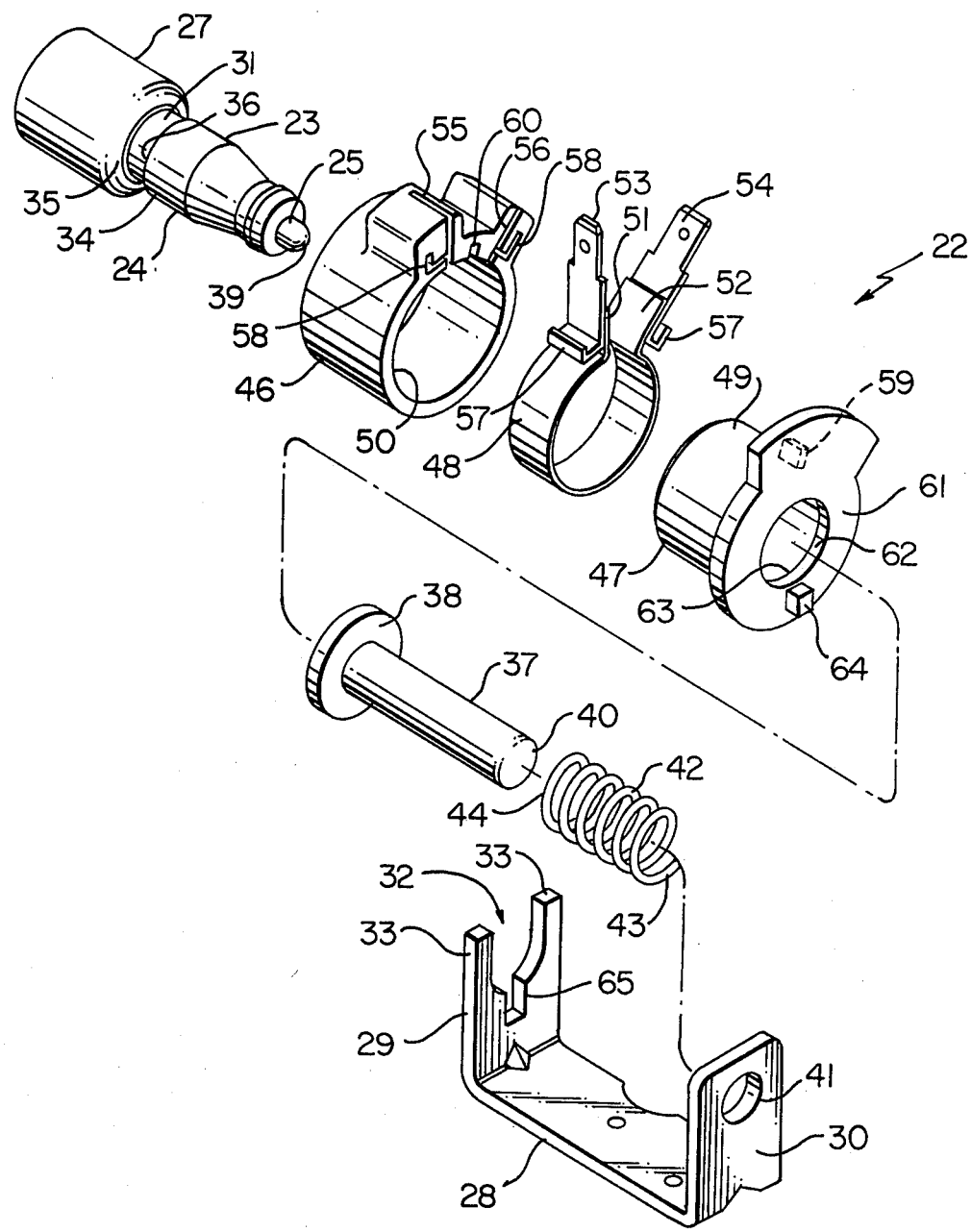
FIG. 7 is an exploded perspective view of the various parts forming the temperature responsive piston and cylinder unit of this invention that is utilized in the pressure operated water level control device of FIG. 1.

The heat motor means 22 of this invention includes an annular electrical heater arrangement that is generally indicated by the reference numeral 26 and is adapted to be disposed and secured in substantially a concentric telescoped relation on a large end section 27, FIG. 7, of the cylinder 24 of the unit 23, the heater arrangement 26 being held in the assembled relation illustrated in FIGS. 1 and 2 by a U-shaped bracket member 28 fastened to the housing means 11 in any suitable manner and having a pair of spaced parallel upstanding flanges 29 and 30 as illustrated.

Figure 6:
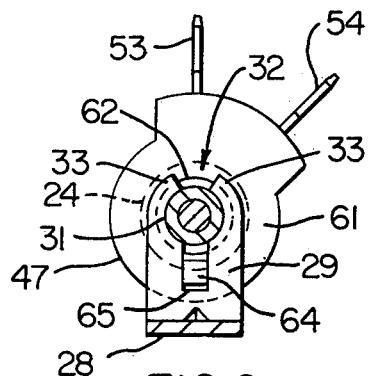
FIG. 6 is a cross-sectional view taken on line 6—6 of FIG. 4.

In particular, the cylinder 24 of the temperature responsive unit 23 has an annular recess 31 formed therein and it is adapted to be received in a suitably shaped slot 32 formed in the flange 29 of the bracket 28 and be secured therein by having the ends 33 of the flange 28 that define the slot 32 deformed toward each other in the manner illustrated in FIG. 6 to thereby secure the temperature responsive piston and cylinder unit 23 to the bracket 28 and, thus, to the control device 10 to operate in a manner hereinafter described.

The cylinder 24 of the unit 23 has the annular groove 31 thereof defined between the larger end section 27 and a smaller intermediate section 34 with the sections of 27 and 34 respectively defining annular shoulders 35 and 36 spaced from each other and facing each other for a purpose hereinafter described.

A piston extender or plunger 37 is provided for the unit 23 and has an enlarged disc end 38 interrupted by a suitable closed bore (not shown) which receives the end 39 of the piston 25 therein a certain distance before the end 39 of the piston 25 bottoms out in the extender 37 to cause the extender 37 to move in unison with the piston 25.

In this manner, the free end 40 of the extender 37 can pass through a suitable guide opening 41 in the flange 30 of the bracket 28 to be guided thereby and a coiled compression spring 42 can be disposed on the extender 37 to have one end 43 engaged against the flange 30 of the bracket 28 while the other end 44 thereof bears against the disc 38 of the extender 37 to continuously tend to urge the extender 37 and, thus, the piston 25 into the cylinder 24. However, when the unit 23 is heated by the heater means 26 in a manner hereinafter set forth, the piston 25 is extended to the right in the drawings to move the extender 37 therewith in opposition to the force of the compression spring 42 to thereby move the free end 40 of the extender 37 from the position illustrated in FIG. 2 to the position illustrated in FIG. 3 and thereby engage against a flange 45 of the cam plate 19 of the selector means 12 to rotate the selector means 12 in a counterclockwise direction from the position illustrated in FIG. 2 to the position illustrated in FIG. 3 and thereby set the water level control device at the low water level setting illustrated in FIG. 3. Subsequently, when the unit 23 is cooled by the heater means 26 being deactivated, the compression spring 42 returns the extender 37 and piston 25 back to the position illustrated in FIG. 2 so that the operator can turn the selector means 12 to any desired high water level setting thereof as desired.

The annular heater means 26 comprises a pair of annular electrical insulating members 46 and 47 and a substantially annular electrical heater member 48 adapted to be telescopically disposed between a tubular projection 49 of the insulating member 47 and the internal cylindrical side wall means 50 of the tubular insulating member 46, the heater member 48 having opposed ends 51 and 52 respectively secured to terminal members 53 and 54 which are adapted to project out of slots 55 and 56 of the member 46 for external lead attachment thereto.

In this manner, an electrical current can be passed between the terminals 53 and 54 to pass through the electrical heater member 48 to cause heating of the same, the heat of this activated heater 48 being directed to the cylinder 24 of the unit 23 by the conductive property of the member 47 to heat the unit 23. In this manner the heater 48 is protected by the insulating members 46 and 47 while still being adapted to heat the unit 23.

The terminals members 53 and 54 respectively have locking flanges 57 which are adapted to be respectively received in locking slot means 58 of the member 46 to prevent the terminal members 53 and 54 from working loose and/or being accidentally pulled off of the heater member 48.

The insulating member 47 has a key member 59 adapted to be received in a key slot 60 of the insulating member 46 so that the members 46 and 47 will be oriented relative to each other to permit axial movement therebetween for assembly purposes while preventing rotational movement therebetween after assembly thereof.

The insulating member 47 also has an enlarged flange end 61 that has a circular opening 62 passing therethrough to define an inside annular shoulder 63 which will abut against the shoulder 35 of the cylinder 24 of the unit 23 when the heater assembly 26 is telescopically disposed thereon in the manner illustrated in FIG. 6. In this manner, the legs 33 of the bracket 28 will be sandwiched between the flange end 61 of the member 47 and the shoulder 36 of the cylinder 24 to thereby hold and secure the heater unit 26 on the piston and cylinder unit 23 in the assembled relation illustrated as well as hold the insulating members 46 and 47 together with the heater member 48 trapped and protected therebetween.

The insulating member 47 has a locating abutment 64 projecting therefrom and adapted to be received in a key slot 65 of the leg 29 of the bracket 28 to thereby prevent rotation of the heater assembly 26 relative to the temperature responsive unit 23 when the heater assembly 26 is secured to the bracket 28.

While the insulating members 46 and 47 can be made of ceramic material, it is to be understood that other suitable materials can be utilized. For example, it may be suitable, and or desirable at times, to use materials with different thermal conductivity rates to achieve the desired application results as will be apparent hereinafter.

Therefore, it can be seen that the heat means 22 of FIG. 7 can be formed of relatively few parts to provide an assembly that is readily adapted to be added to the water level control device 10 to operate the same in a manner now to be described.

Figure 3:
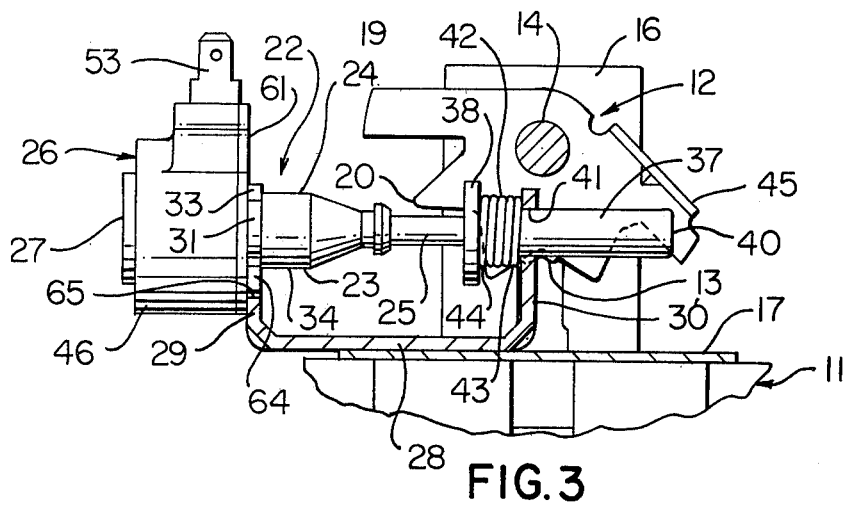
FIG. 3 is a fragmentary view similar to FIG. 2 and illustrates the control device in another operating position thereof.
Figure 4:
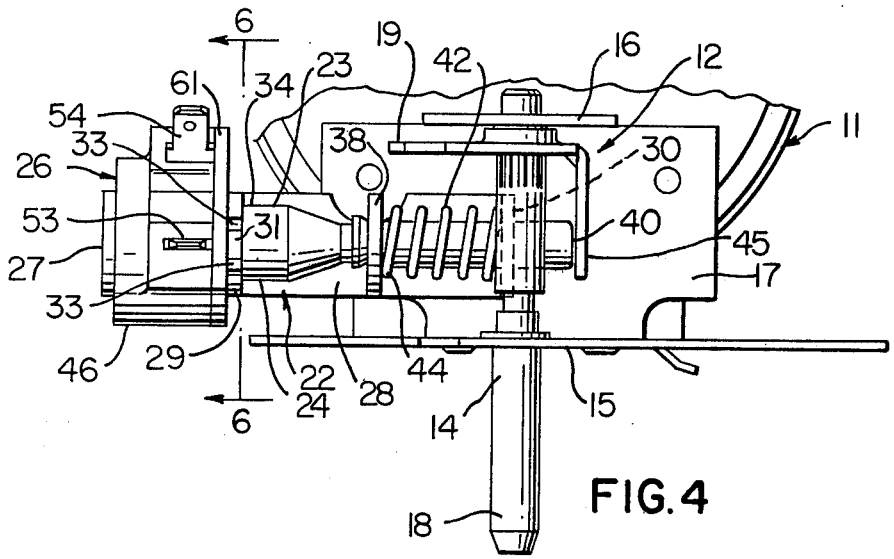
FIG. 4 is a fragmentary top view taken in the direction of the arrows 4—4 of FIG. 2.
Figure 5:
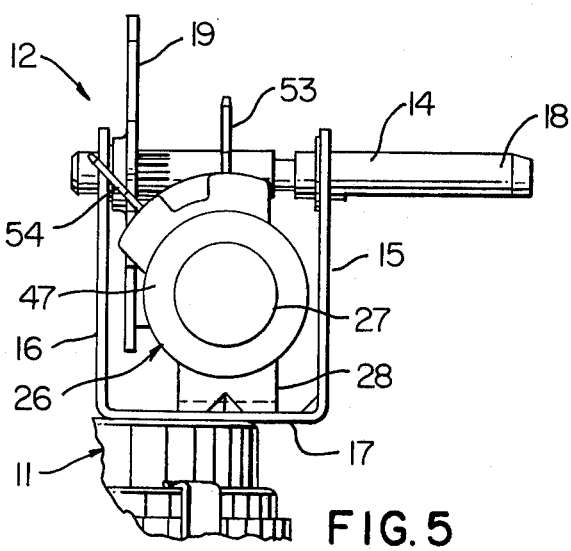
FIG. 5 is a fragmentary end view taken in the direction of the arrows 5—5 of FIG. 1.

Assuming that the operator of the water level control device 10 has turned the selector means 14 to the high water level setting illustrated in FIG. 2 for a particular washing load of the washing machine control device 10, at the end of the wash cycle thereof and before the main selector means (not shown) for the washing machine moves to its "off" position, a suitable switch therein electrically interconnects an electrical current to the terminals 53 and 54 of the heater means 26 to cause the heater member 48 to be activated and, thus, heat the temperature responsive unit 23 to cause the piston 25 thereof to extend to the right in opposition to the force of the compression spring 42 and thereby through the extender 37 engage against the flange 45 of the cam plate 19 and rotate the cam plate 19 in a counterclockwise direction from the position illustrated in FIG. 2 to the position illustrated in FIG. 3 and thereby set the selector means 12 in the certain low water level setting thereof.

Thereafter, the electrical current to the heater means 48 is terminated and the unit 23 cools so that the piston 25 is retracted into the cylinder 24 by the force of the compression spring 42 that also moves the extender 37 back to the out of way position illustrated in FIG. 2.

Thus, at this time, the washing machine automatically turns itself off and should the operator desire to utilize the washing machine for another load of wash, the water level control device 10 is already set in a low water level condition thereof so that should the operator only desire such a low water level for the particular load being utilized, the device 10 is already set in this position so that if the operator wants a higher water level the operator must turn the selector means 12 to such higher water level selection condition, such as illustrated in FIG. 2.

In this manner, should the operator not want a high water level condition, the operator will not be provided with a high water level condition merely because the operator had previously selected a high water level condition and it is believed that by providing the automatically operated heat motor means 22 of this invention, an energy savings will be provided so that the water level control device 10 will always return to a low water level setting thereof at the end of the cycle of operation of the washing machine utilizing the same for the reasons previously set forth.

Therefore, it can be seen that this invention not only provides an improved pressure operated water level control device, but also this invention provides an improved temperature responsive piston and cylinder unit for such a control device or the like.

While the forms of this invention now preferred have been illustrated and described as required by the Patent Statute, it is to be understood that other forms can be utilized and still fall within the scope of the appended claims.

What is claimed is:

1. In a temperature responsive piston and cylinder unit wherein the piston thereof is extended relative to the cylinder thereof when the unit is heated and said piston is adapted to be retracted into said cylinder when the unit is cooled, an annular electrical heater means being carried in substantially a concentric manner on said cylinder of said unit for heating said unit to extend said piston thereof when said heater means is activated, the improvement wherein said heater means comprises a pair of telescoping annular electrical insulating members telescoped on said cylinder of said unit, and an electrical heater member disposed between said insulating members to be energized by having an electrical current passed therethrough.

2. A unit as set forth in claim 1 wherein said heater member has opposed ends, a pair of terminals respectively interconnected to said ends, one of said insulating members having opening means through which said terminals projects to the exterior of said heater means.

3. A unit as set forth in claim 2 wherein said one insulating member has locking slots, said terminals respectively having locking flanges disposed in said locking slots.

4. A unit as set forth in claim 2 wherein said insulating members respectively have spline means cooperating together to prevent rotational movement therebetween while permitting axial movement therebetween.

5. A unit as set forth in claim 2 and including a bracket having a flange secured to said cylinder to carry said unit therewith.

6. A unit as set forth in claim 5 wherein said flange has a slot that receives said cylinder, said flange being deformed at said slot to secure said cylinder in said slot.

7. A unit as set forth in claim 5 wherein one of said insulating members has a key means, said flange having a key means cooperating with said key means of said one insulating member to prevent rotational movement therebetween.

8. A unit as set forth in claim 5 wherein said cylinder has an annular groove means therein, said flange being secured in said annular groove means.

9. A unit as set forth in claim 8 wherein one of said insulating members has shoulder means held in said annular groove means by said flange of said bracket whereby said heater means is secured to said cylinder by said flange.

* * * * *